United States Patent [19]

Kinz

[11] Patent Number: 4,618,047
[45] Date of Patent: Oct. 21, 1986

[54] FRICTION CLUTCH WITH PIVOTABLE DIAPHRAGM SPRING ON THE CLUTCH COVER

[75] Inventor: Peter Kinz, Baden-Baden, Fed. Rep. of Germany

[73] Assignee: Luk Lamellen und Kupplungsbau GmbH, Buhl, Fed. Rep. of Germany

[21] Appl. No.: 634,768

[22] Filed: Jul. 26, 1984

[30] Foreign Application Priority Data

Jul. 29, 1983 [DE] Fed. Rep. of Germany ....... 3327432
Aug. 27, 1983 [DE] Fed. Rep. of Germany ....... 3347801

[51] Int. Cl.$^4$ .............................................. F16D 13/50
[52] U.S. Cl. ............................ 192/89 B; 192/70.27; 267/161
[58] Field of Search ............... 192/70.27, 89 B; 267/158, 161, 163, 164, 181

[56] References Cited

U.S. PATENT DOCUMENTS

| | | | |
|---|---|---|---|
| 2,100,464 | 11/1937 | Almen et al. | 192/70.27 |
| 2,246,231 | 6/1941 | Almen | 192/89 B |
| 3,323,624 | 6/1967 | Maurice | 192/89 B |
| 3,712,435 | 1/1973 | Kraus | 192/89 B X |
| 4,241,819 | 12/1980 | Babcock et al. | 192/70.27 |
| 4,254,853 | 3/1981 | Huber | 192/89 B |
| 4,399,897 | 8/1983 | Billet et al. | 192/89 B |

Primary Examiner—George H. Krizmanich
Attorney, Agent, or Firm—Peter K. Kontler

[57] ABSTRACT

A friction clutch wherein the diaphragm spring is pivotably held between two seats one of which is provided at the inner side of the clutch cover and the other of which is secured to the cover by rivets or claws extending through slots between the radially inwardly extending prongs of the diaphragm spring. One side of the diaphragm spring has reinforcing ribs extending radially along the outer portions of the prongs, between the two seats and into the circumferentially complete outer marginal portion of the spring. That seat which is adjacent to the ribs has arcuate bridges which are slightly spaced apart from the ribs, and such seat is further formed with undulations which alternate with the bridges and define with the diaphragm spring shallow clearances to reduce the area of contact between the diaphragm spring and the respective seat. The bridges and the undulations reduce the danger of breakage of the diaphragm spring in the regions of enlarged outer end portions of the slots between the prongs.

31 Claims, 11 Drawing Figures

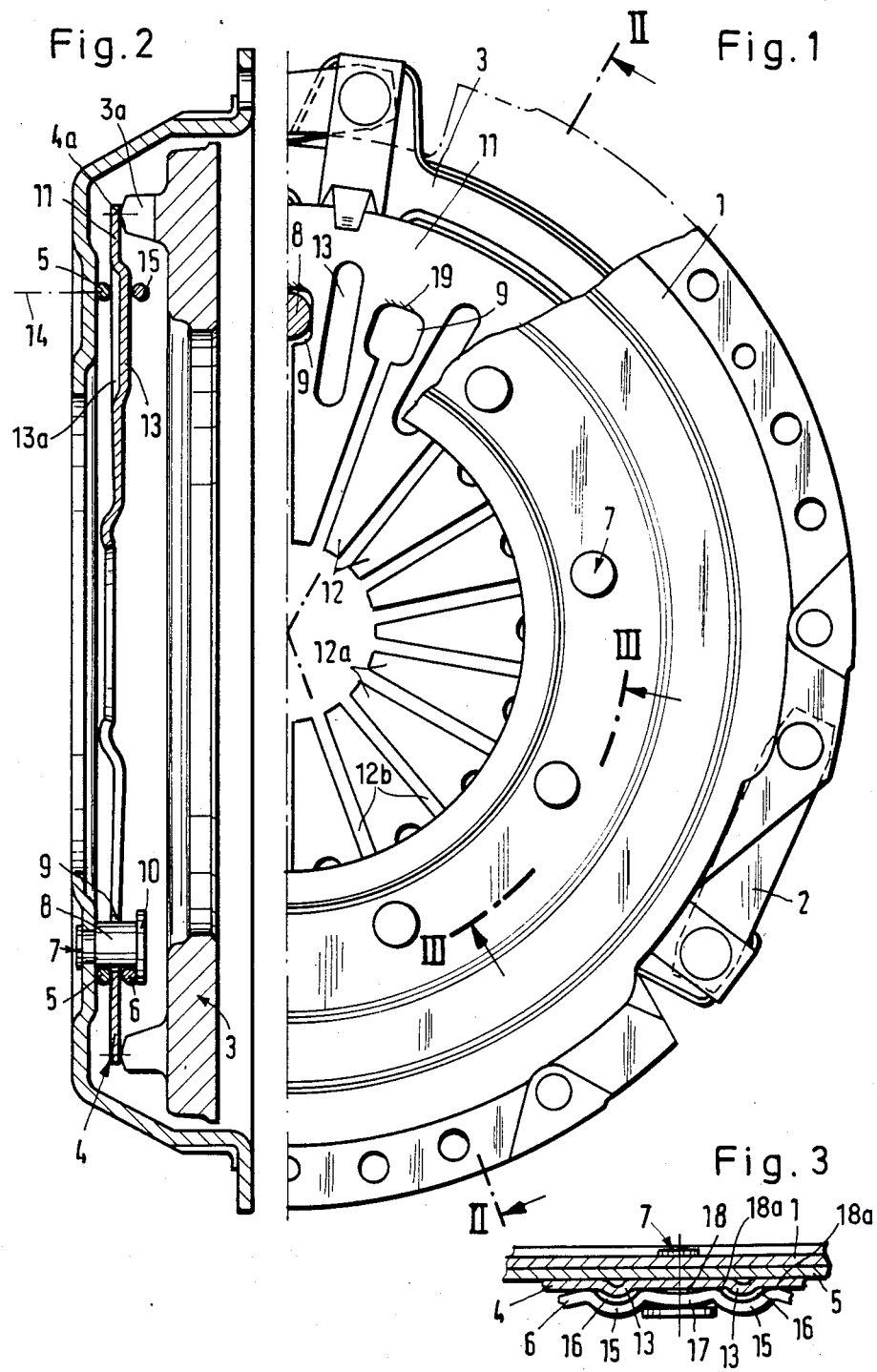

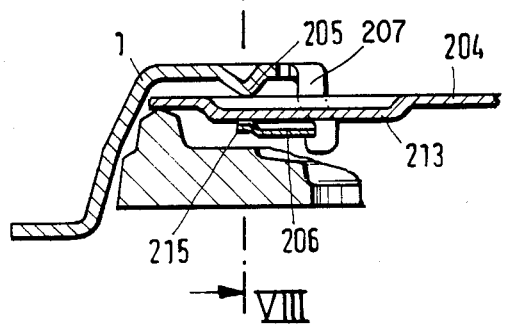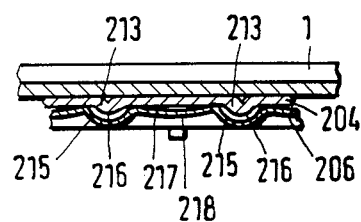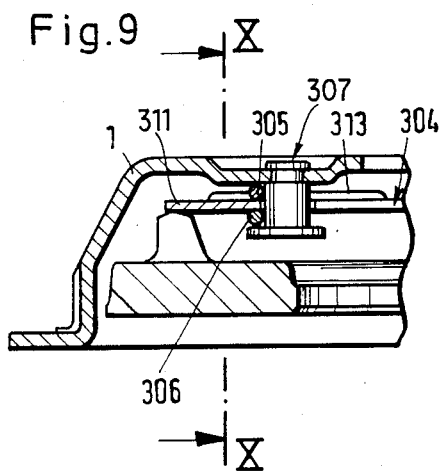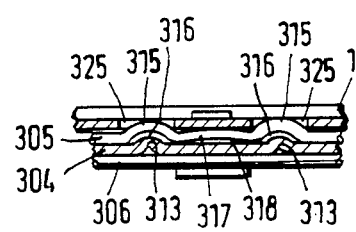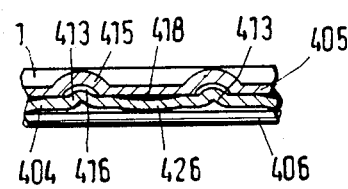

FRICTION CLUTCH WITH PIVOTABLE DIAPHRAGM SPRING ON THE CLUTCH COVER

CROSS-REFERENCE TO RELATED CASE

A friction clutch wherein the diaphragm spring has reinforcing portions and the adjacent seat has arcuate portions bridging the reinforcing portions of the diaphragm spring is disclosed, for example, in commonly owned copending patent application Ser. No. 588,750 filed Mar. 12, 1984 by Helmut Kohler for "Friction clutch and method of making a diaphragm spring therefor".

BACKGROUND OF THE INVENTION

The present invention relates to friction clutches in general, and more particularly to improvements in friction clutches which are especially suited for use in motor vehichles. Still more particularly, the invention relates to improvements in friction clutches of the type wherein a clutch cover is provided with two concentric annular seats flanking an intermediate portion of a diaphragm spring whose outer marginal portion can bear upon a pressure plate and whose radially inwardly extending prongs can be acted upon to engage or disengage the clutch.

It is already known to provide the diaphragm spring of a friction clutch with substantially radially extending reinforcing portions which are formed into or otherwise applied to the prongs, which extend from one side of the spring and which serve to stiffen the prongs in the regions where their outer end portions merge into the aforementioned outer marginal portion of the spring. It is also known to provide that seat which is adjacent to the one side of the diaphragm spring with arcuate portions which bridge the reinforcing portions of the spring. In many instances, each of the seats constitutes a wire ring and each of these rings is affixed to the cover of the friction clutch, e.g., by means of rivets which extend through the enlarged outer end portions of slots between some or all of the prongs. The arcuate portions are normally provided in that seat which is more distant from the cover so that the other seat can be made integral with the cover. It is also possible to provide the cover with a circumferentially complete or interrupted rib which constitutes one of the two seats for the diaphragm spring. Furthermore, the arcuate portions can be provided in the integral rib-shaped portion of the seat so that the other seat can constitute a simple wire ring.

The provision of reinforcing portions on some or all of the prongs reduces the area of contact between the spring and that seat which is formed with arcuate portions because the arcuate portions are normally out of contact with the adjoining reinforcing portions. This entails a pronounced increase in the magnitude of forces acting between the diaphragm spring and that seat which is formed with the arcuate portions per unit area of contact between these parts. The just mentioned forces are especially pronounced in the regions of enlarged outer end portions of slots between the prongs of the diaphragm spring. The situation is aggravated due to the fact that the just mentioned regions are already subjected to very pronounced stresses. Therefore, the configuration of the outer end portions of the slots must be selected with great care in order to avoid an excessive increase of forces and resulting damage to or total destruction of the diaphragm spring. This often necessitates replacement of the entire clutch, especially if the diaphragm spring is more or less permanently installed between the two seats which, in turn, are permanently or more or less permanently installed on or made part of the cover of the friction clutch.

OBJECTS AND SUMMARY OF THE INVENTION

An object of the invention is to provide a novel and improved friction clutch which is constructed and assembled in such a way that its diaphragm spring can stand longer periods of use.

Another object of the invention is to provide the friction clutch with novel and improved seats for the diaphragm spring.

A further object of the invention is to provide a novel and improved diaphragm spring for use in the above outlined friction clutch.

An additional object of the invention is to provide a novel and improved method of accurately selecting the locations of contact between one or both seats and the diaphragm spring of a friction clutch.

Still another object of the invention is to provide a motor vehicle which embodies the improved friction clutch.

An additional object of the invention is to provide a friction clutch wherein the magnitude of forces acting upon the diaphragm spring in the regions of the outer end portions of the slots between its prongs is reduced in a novel and improved way.

Another object of the invention is to provide a friction clutch which can utilize relatively simple but highly effective seats for the diaphragm spring and wherein the seats are constructed, assembled and mounted with a view to prolong the useful life of the diaphragm spring.

One feature of the invention resides in the provision of a friction clutch, particularly for use in motor vehicles, which comprises, in addition to certain other standard components, a diaphragm spring having a first side and a second side and including a circumferentially complete outer marginal portion (which can bear against a pressure plate of the friction clutch) and an annulus of prongs extending substantially radially inwardly from the marginal portion, alternating with slots and having elongated reinforcing portions in the form of stamped-out ribs extending from the second side of the diaphragm spring and radially outwardly beyond the neighboring slots, a cover which is adjacent to one side of the diaphragm spring, a first ring-shaped seat which is provided on the cover adjacent to the first side of the diaphragm spring in the region of the reinforcing portions, and a second ring-shaped seat which is also provided on the cover but is adjacent to the second side of the diaphragm spring opposite the first seat so that the spring can pivot between the two seats. The second seat has arcuate portions each of which bridges a different reinforcing portion, and the diaphragm spring and the second seat define clearances intermediate at least some of the arcuate portions of the second seat. Each reinforcing portion of the diaphragm spring is preferably in register with a complementary cavity in the first side of the spring, i.e., the reinforcing portions are preferably formed by shifting some material of the diaphragm spring in a direction from the first toward the second side so as to form cavities in the first side and to simultaneously form reinforcing portions in the second side of the spring.

The clutch further comprises a plurality of fasteners which connect the cover with the seat at the other side of the diaphragm spring, i.e., with the seat which is more distant from the cover. Each such fastener is flanked by a pair of reinforcing portions and one of the aforementioned clearances is provided between each such pair of reinforcing portions. In other words, the number of clearances need not match the number of reinforcing portions and/or the number of arcuate portions. Alternatively, one clearance can be provided between each and every pair of neighboring arcuate portions of the second seat.

The second side of the diaphragm spring can be formed with depressions which define the aforementioned clearances. In other words, the diaphragm spring can be provided with deformed portions in the regions of the clearances so that each deformed portion of the diaphragm spring and the adjacent portion of the second seat define one of the clearances. Such diaphragm spring can be said to have alternating hills and valleys or only a set of valleys each of which is adjacent to one of the clearances or each of which defines a clearance. The hills of the diaphragm spring can extend from its second side.

The second seat can be formed with undulations which alternate with the arcuate portions and define the clearances. A single undulation can be provided intermediate each pair of neighboring arcuate portions. Each arcuate portion has a concave side facing the second side of the diaphragm spring, and the depth of such arcuate portions exceeds the depth of the undulations, as measured in the axial direction of the friction clutch. The depth of the clearances can be between 0.03 and 0.4 mm, preferably between 0.05 and 0.2 mm.

If one side of the diaphragm spring is the first side, i.e., if the arcuate portions are provided in that seat which is more distant from the cover, the second seat can constitute a wire ring having undulations which alternate with its arcuate portions and each such undulation has a concave side facing the second side of the diaphragm spring in the region of one of the clearances. The arcuate portions also have concave sides facing the second side of the diaphragm spring. The second seat can include a washer (preferably a second diaphragm spring), and such washer is then formed with undulations alternating with the arcuate portions and having concave sides facing the second side of the diaphragm spring, the same as the concave sides of the arcuate portions of the second seat.

If the second side of the diaphragm spring faces the cover, the second seat can constitute an integral part of the cover. Such cover then preferably includes undulations which alternate with the arcuate portions of its integral seat and having concave sides facing the second side of the diaphragm spring in the regions of the clearances. The second seat which is integral with the cover can constitute an interrupted or a circumferentially complete rib.

It is not always necessary that the second seat be integral with the cover if the second side of the diaphragm spring faces the inner side of the cover. Such second seat can include or constitute a wire ring which is interposed between the cover and the diaphragm spring and has undulations alternating with arcuate portions. The concave sides of the undulations face the second side of the diaphragm spring in the regions of the clearances. The cover can be provided with openings for portions of or for the entire arcuate portions of the wire-like second seat. In other words, the arcuate portions of the second seat (if such second seat is immediately adjacent to the cover) can extend in part beyond the inner side of the cover.

At least some arcuate portions of the second seat are preferably out of contact with the respective reinforcing portions of the diaphragm spring. The arrangement may be such that each arcuate portion is at least partially out of contact with the respective reinforcing portion. The maximum depth of gaps between the arcuate portions and the respective reinforcing portions may be between 0.02 and 1 mm, preferably between 0.05 and 0.8 mm.

The portions of contact between the second seat and the second side of the diaphragm spring are preferably immediately or closely adjacent to and flank the reinforcing portions of the diaphragm spring. The first seat can also be designed in such a way that it has contact portions which are immediately adjacent to and flank the reinforcing portions (actually the cavities in the first side of the diaphragm spring).

The second seat can include a relatively small number of substantially sinusoidal portions each of which includes a plurality of arcuate portions and undulations alternating with the arcuate portions. The concave sides of the sinusoidal portions face the second side of the diaphragm spring, and the maximum depth of the sinusoidal portions preferably exceeds the maximum depth of the undulations but is less than the maximum depth of the arcuate portions, as considered in the axial direction of the diaphragm spring.

Another feature of the invention resides in the provision of a substantially ring-shaped (wire-like or washer-like) seat for use in a friction clutch at one side of a diaphragm spring of the type having a circumferentially complete outer marginal portion, a plurality of substantially radially disposed prongs extending inwardly from the marginal portion, slots alternating with the prongs, and elongated reinforcing portions provided on at least some of the prongs and extending radially outwardly beyond the neighboring slots and beyond the one side of the diaphragm spring. The seat comprises arcuate portions which bridge the reinforcing portions of the diaphragm spring and undulations which alternate with the arcuate portions and have concave sides facing the one side of the spring. The undulations are preferably shallower than the arcuate portions, as considered in the axial direction of the seat.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic front elevational view of a friction clutch which embodies one form of the invention and wherein the reinforcing portions extend from that side of the diaphragm spring which faces away from the cover;

FIG. 2 is a sectional view as seen in the direction of arrows from the line II—II of FIG. 1;

FIG. 3 is a fragmentary sectional view as seen in the direction of arrows from the line III—III of FIG. 1;

FIG. 7 is a fragmentary axial sectional view of a third friction clutch wherein the seat which is provided with arcuate portions is a resilient washer and the reinforcing portions of the diaphragm spring face away from the inner side of the cover;

FIG. 8 is a sectional view as seen in the direction of arrows, from the line VIII—VIII of FIG. 7;

FIG. 9 is a fragmentary axial sectional view of a fourth friction clutch wherein the reinforcing portions of the diaphragm spring face the inner side of the cover and the seat which is provided with arcuate portions is immediately adjacent to the cover and includes portions extending outwardly beyond the inner side of the cover.

FIG. 10 is a sectional view as seen in the direction of arrows from the line X—X of FIG. 9; and FIG. 11 is a sectional view similar to that of FIG. 10 but showing a diaphragm which is formed with undulations between the neighboring reinforcing portions.

DESCRIPTION OF THE PREFERRED EMBODIMENTS

Figure 4:
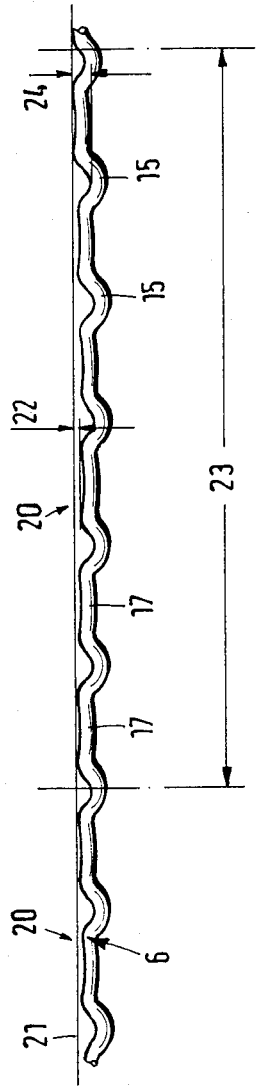
FIG. 4 is a fragmentary developed view of one of the seats in the friction clutch of FIGS. 1 to 3.

Referring first to FIGS. 1 to 3, there is shown a friction clutch which comprises a cupped cover 1 which is connected with a pressure plate 3 by a set of leaf springs 2 in such a way that the parts 1, 3 rotate as a unit but the pressure plate is free to move (within limits) axially of the cover. The friction clutch further comprises a diaphragm spring 4 which is disposed between two annular seats 5 and 6 provided on the cover 1. The radially outermost part 4a of the outer marginal portion 11 of the diaphragm spring 4 is a circumferentially complete washer-like body and can bear against the adjacent protuberances 3a of the pressure plate 3 so as to urge the latter in a direction to the right, as viewed in FIG. 2, and into frictional engagement with one of two linings on a clutch disc, not shown, the other lining of which receives torque from a flywheel on the crankshaft of a motor vehicle. The flywheel rotates the cover 1, and the aforementioned clutch disc can transmit torque to the input shaft of a change-speed transmission, not shown. Reference may be had to commonly owned U.S. Pat. No. 3,712,435 granted Jan. 23, 1973 to Kraus.

The diaphragm spring 4 is pivotable between the seats 5 and 6 so as to move the part 4a of its marginal portion 11 into and from pronounced engagement with the adjacent protuberances 3a of the pressure plate 3. The seat 6 is remote from the cover 1, i.e., it is adjacent to that side of the diaphragm spring 4 which faces away from the cover 1, and the other seat 5 is disposed between the other side of the spring 4 and the inner side of the cover. In the embodiment of FIGS. 1 to 3, the seat 5 is a wire ring which is disposed in a plane that is normal to the common axis of the pressure plate 3, cover 1 and diaphragm spring 4. Each of the two seats 5, 6 has a circular cross-sectional outline. The seats 5 and 6 are disposed opposite each other and they have a common axis which coincides with the aforementioned common axis of the parts 1, 3 and 4.

The means for coupling the diaphragm spring 4 and the seats 5, 6 to the cover 1 comprises an annulus of preferably equidistant connectors or fasteners in the form of rivets 7 each having a smaller head outwardly adjacent to the cover 1, a larger-diameter shank portion 8 extending into one of several enlarged radially outermost portions 9 of radially extending slots 12b in the diaphragm spring 4, and a larger head 10 overlying that side of the ring-shaped seat 6 that faces away from the spring 4.

The diaphragm spring 4 further comprises an annulus of prongs or fingers 12 which extend radially inwardly of the marginal portion 11 and alternate with the slots 12b. The radially innermost portions or tips 12a of the prongs 12 surround a centrally located opening of the diaphragm spring 4 and can be moved axially of the clutch in order to pivot the diaphragm spring in the region between the seats 5, 6 in order to move the outermost part 4a of the marginal portion 11 toward or away from the inner side of the cover 1, i.e., to respectively disengage or engage the friction clutch.

At least some but preferably all of the prongs 12 have reinforcing portions 13 in the form of elongated ribs which extend beyond the right-hand side of the major portion of the diaphragm spring 4, as viewed in FIG. 2, i.e., away from the inner side of the cover 1. The reinforcing portions 13 (hereinafter called ribs for short) extend radially inwardly and outwardly beyond the seats 5, 6 and are preferably formed by stamping the corresponding portions of the diaphragm spring 4 out of the general plane of the spring so that each rib 13 registers with a complementary recess or cavity 13a at the other side of the diaphragm spring, namely, at the side which faces the seat 5 and the inner side of the cover 1. The purpose of the ribs 13 is to reduce the extent of flexing of the prongs 12 when the tips 12a of such prongs are acted upon by a release bearing or the like. Each of the illustrated ribs 13 terminates short of the tip 12a of the respective prong 12 and short of the peripheral surface or edge face of part 4a of the outer marginal portion 11. The region where the diaphragm spring 4 is caused to pivot between the seats 5 and 6 in response to the application of a push or pull to the tips 12a of the prongs 12 is shown at 14. As mentioned above, the ribs 13 extend radially across such region.

In order to ensure satisfactory mounting of the diaphragm spring 4 between the seats 5, 6 in spite of the provision of ribs 13 which extend radially across the zone 14, the seat 6 is formed with arcuate portions 15 (hereinafter called bridges for short), one for each of the ribs 13 and each bridging the respective rib, as considered in the circumferential direction of the diaphragm spring 4 and cover 1. Such bridges 15 are formed by suitable bending of the corresponding portions of the seat 6, and the concave inner side of each bridge 15 may but need not be in actual contact with the adjacent rib 13. The gaps between the ribs 13 and the corresponding bridges 15 are shown at 16 (see FIG. 3), and the maximum width or depth of each such gap (as considered in the axial direction of the clutch) may be between 0.02 and 1 mm, preferably between 0.05 and 0.8 mm.

As can be seen in FIG. 3, the seat 6 is further formed with undulations 17 (hereinafter called arcs) which alternate with the bridges 15 and whose concave sides face the adjacent side of the diaphragm spring 4 to define therewith rather shallow clearances 18. The maximum depth of the clearances 18, as measured in the axial direction of the clutch, can be between 0.03 and 0.4 mm, preferably between 0.05 and 0.2 mm. It will be noted that the bridges 15 and the arcs 17 are curved in the same direction, except that the bridges are deeper and the arcs are longer as respectively considered axially and circumferentially of the diaphragm spring 4.

The provision of arcs 17, in addition to the bridges 15, ensures that the respective side of the diaphragm spring 4 is contacted only by those (contact) portions 18a of the seat 6 which alternate with the bridges 15 and arcs 17 and are preferably immediately or very closely adjacent to the respective sides of the corresponding ribs 13. This prevents the seat 6 from applying a force to those portions of the diaphragm spring 4 which are indicated in FIG. 1 by hatching (as at 19) and are radially outwardly adjacent to the enlarged outer end portions 9 of the slots 12b.

A portion of the seat 6 is shown in a developed view in FIG. 4. This seat comprises a relatively small number of sinusoidal portions 20 whose number may but need not exceed two and each of which includes several bridges 15 and several arcs 17. The sinusoidal portions 20 extend axially from one side of a referance plane 21 which can be said to constitute the inner or right-hand side of the diaphragm spring 4, as viewed in FIG. 2. It will be noted that the maximum depth 24 of cavities at the concave sides of the bridges 15 exceeds the maximum depth of the arcs 17 and sinusoidal portions 20, and that the maximum depth 22 of each sinusoidal portion 20 (i.e., the maximum distance from the reference plane 21) exceeds the maximum depth of any of the arcs 17. The reference character 23 denotes the length of a sinusoidal portion 20, as considered in the circumferential direction of the seat 6. The length of each arc 17, as considered in the circumferential direction of the seat 6, can equal or exceed the length of a bridge 15.

An important advantage of sinusoidal portions 20 of the seat 6 which is provided with the bridges 15 and arcs 17 is that such sinusoidal portions reduce the likelihood of generation of noise in response to progressing wear upon the parts of the friction clutch. The seat 6 and its sinusoidal portions 20 act not unlike a spring which biases the diaphragm spring 4 axially toward the seat 5 which is immediately adjacent to the inner side of the cover 1. The provision of sinusoidal portions in that seat which is more distant from the cover 1 can be dispensed with if such seat constitutes a diaphragm spring, such as the seat 206 which is shown in FIGS. 7 and 8.

In the embodiment of FIGS. 1 to 4, the seat 6 is formed with an arc 17 between each pair of neighboring bridges 15. Thus, the number of arcs 17 matches the number of bridges 15 and the number of ribs 13. In other words, a clearance 18 is provided intermediate the diaphragm 4 and the seat 6 between each pair of neighboring ribs 13. However, it is equally within the purview of the invention to reduce the overall number of arcs 17 and clearances 18. For example, the arrangement may be such that an arc 17 is provided for each rivet 7 and each such arc 17 then extends between a pair of ribs 13 which flank a rivet 7. This can result in a reduction of the total number of arcs 17 and clearances 18 to half the number of bridges 15 if the rivets 7 are distributed in a manner as shown in FIG. 1, i.e., so that each second enlarged portion 9 receives the larger-diameter portion 8 of the shank of a rivet 7. Such reduction in the number of arcs 17 simplifies the process of making the seat 6 and the machinery for forming the bridges 15 and the arcs 17.

When the friction clutch is in actual use, the diaphragm spring 4 bends moderately or slightly in the region of the enlarged outer end portions 9 of the slots 12b. The bending takes place in a direction away from the cover 1. Thus, the bending or flexing of the diaphragm spring 4 is in the same direction as that of the arcs 17. This is desirable and advantageous because the thus developing arcs of the diaphragm spring 4 conform to or resemble the arcs 17 of the seat 6. This, in turn, ensures a more uniform distribution of pressures between the surfaces of the parts 4 and 6. The situation is similar if the wire-like seat 6 of FIGS. 1 to 3 is replaced with a washer-like resilient seat of the type shown (at 206) in FIGS. 7 and 8.

Figure 6:
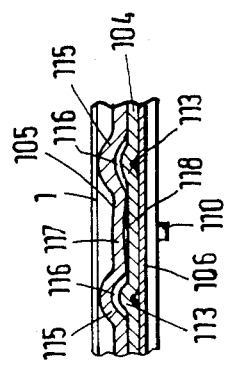
FIG. 6 is a sectional view as seen in the direction of arrows from the line VI—VI of FIG. 5.
Figure 5:
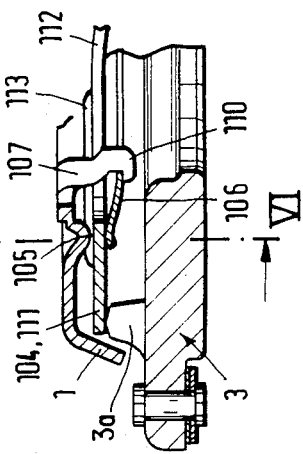
FIG. 5 is a fragmentary axial sectional view of a second friction clutch wherein one of the seats is integral with the cover and the reinforcing portions of the diaphragm spring face the inner side of the cover.

The clutch of FIGS. 5 and 6 comprises a cover 1, a diaphragm spring 104 having a circumferentially complete outer marginal portion 111 and radially inwardly extending prongs 112, a pressure plate 3 whose protuberances 3a are engaged by the marginal portion 111, and means for pivotably mounting the diaphragm spring 104 on the cover 1. Such mounting means comprises a seat 105 which is an integral part of the cover 1 and constitutes a circumferentially complete or interrupted rib extending beyond the inner side of the cover 1 and being concentric with a ring-shaped washer-like seat 106 at that side of the diaphragm spring 104 which faces away from the cover 1. The seat 106 is actually a diaphragm spring which is biased against the respective side of the diaphragm spring 104 by several claws 107 constituting integral parts of the cover 1 and replacing the rivets 7 of FIGS. 1 and 2. These claws extend through radial slots between the prongs 112 of the diaphragm spring 104. The purpose of the diaphragm spring-like seat 106 is to compensate for machining and other tolerances as well as for wear upon the parts of the friction clutch. In other words, the seat 106 exhibits a self-adjusting feature by continuing to bear against the respective side of the diaphragm spring 104 even after such spring and/or the seat 105 and/or 106 undergoes a certain or even a substantial amount of wear. The pallets 110 at the ends of the claws 107 extend through a central opening of the washer-like seat 106 and bear against that side of this seat which faces away from the diaphragm spring 104.

The reinforcing portions or ribs 113 on the prongs 112 of the diaphragm spring 104 serve the same purpose as the ribs 13 of the clutch which is shown in FIGS. 1 to 3. The difference between the two embodiments is that the ribs 113 extend from that side of the diaphragm spring 104 which faces toward the inner side of the cover 1, i.e., the arcuate portions or bridges 115 are provided on that seat 105 which is integral with the cover 1. The gaps between the concave inner sides of the bridges 115 and the adjacent sides of the ribs 113 are shown at 116.

In order to reduce the area of contact between the diaphragm spring 104 and the seat 105, the latter is further formed with undulations or arcs 117 which alternate with the bridges 115 and each of which defines with the adjacent side of the diaphragm spring 104 a relatively narrow clearance 118. The provision of such clearances ensures that the seat 105 abuts against the diaphragm spring 104 only at contact points which are immediately adjacent to and flank the ribs 113. The maximum depth of the gaps 116 and clearances 118 may be the same as described in connection with the gaps 16 and clearances 18 in the clutch of FIGS. 1 to 3.

Referring to FIGS. 7 and 8, there is shown a portion of a further friction clutch wherein the cover 1 is provided with an integral circumferentially complete or interrupted rib-like seat 205 and the means for mounting the diaphragm spring 204 on the cover 1 further comprises a second seat 206 which is a thin resilient washer and is adjacent to that side of the diaphragm spring 204 from which the reinforcing portions or ribs 213 extend. The bridges 215 and the undulations or arcs 217 are provided on the seat 206, and each bridge 215 defines with the respective rib 213 a gap 216. Also, the concave side of each arc 217 defines with the adjacent side of the diaphragm spring 204 a clearance 218. The gaps 216 alternate with the clearances 218, as considered in the circumferential direction of the seat 206, so as to reduce the area of engagement between the seat 206 and the diaphragm spring 204 to a relatively small number of contact points which are immediately adjacent to and flank the ribs 213.

The manner in which the diaphragm spring-like seat 206 is secured to the cover 1 by a set of claws 207 extending through the slots between the prongs of the diaphragm spring 204 is the same or substantially the same as described in connection with FIGS. 5 and 6. The provision of arcs 217 ensures that the area of contact between the diaphragm spring 204 and the seat 206 is limited to certain zones and is not excessive in the regions of enlarged outer end portions (not shown in FIGS. 7 and 8) of the slots between the prongs of the diaphragm spring 204. The configuration of such enlarged outer end portions of the slots can be the same as shown in FIGS. 1 and 2.

FIGS. 9 and 10 show a portion of a further friction clutch which has a cover 1 and a diaphragm spring 304 between two concentric seats 305, 306. The reinforcing portions or ribs 313 extend from that side of the diaphragm spring 304 which faces the inner side of the cover 1 and each of the two seats 305, 306 constitutes a wire ring. The seat 305 is formed with arcuate portions or bridges 315, one for each of the ribs 313, and with undulations or arcs 117 which alternate with the bridges 315, as considered in the circumferential direction of the seat 305. Each rib 313 extends radially inwardly and outwardly beyond the two seats 305, 306, i.e., each such rib extends into the respective prong of the diaphragm spring 304 as well as into the adjacent part of the outer marginal portion 311 of the diaphragm spring. Each of the seats 305, 306 has a circular cross-sectional outline and the entire seat 306 is disposed in a plane which extends at right angles to the axis of the friction clutch. The means for fastening or coupling the seats 305, 306 to the cover 1 comprises an annulus of rivets 307 having smaller-diameter outer heads adjacent to the outer side of the cover 1 and larger-diameter heads inwardly adjacent to the seat 305.

The bridges 315 and the respective ribs 313 define gaps 316, and the arcs 317 and the adjacent side of the diaphragm spring 304 define clearances 318. The provision of gaps 316 is desirable and advantageous because they allow for more predictable pivoting of the diaphragm spring 304 relative to the seats 305, 306.

As can be seen in FIG. 10, the cover 1 has openings or cutouts 325 for portions of the bridges 315. In other words, such bridges can extend outwardly beyond the inner side of the cover 1. It is also possible to provide the inner side of the cover 1 with recesses for portions of the bridges 315, i.e., it is not absolutely necessary to provide the cover 1 with openings 325 for the bridges.

FIG. 11 shows a modification of the friction clutch of FIGS. 9 and 10. The clearances 418 between the seat 405, which is formed with the bridges 415, and the respective side of the diaphragm spring 404 are defined by deformed portions in the form of depressions or valleys 426 which are provided in the diaphragm spring between the neighboring reinforcing portions or ribs 413. Those parts of the spring 404 which alternate with the depressions or valleys 426 can be said to constitute hills. The seat 405 is an integral rib of the cover 1 and the other seat 406 is a wire ring disposed (in its entirety) in a plane which is normal to the axis of the clutch. The valleys 426 are formed at the time the diaphragm spring 404 is made. The gaps between the bridges 415 and the respective ribs 413 are shown at 416.

The improved friction clutch is susceptible of many additional modifications without departing from the spirit of the invention. For example, the arcs 17 shown in FIG. 3 can be formed by suitable bending of the seat 6 as well as or by shifting of some of the material of the seat 6. The same applies for the arcs 117, 217, 317 and valleys 426.

An important advantage of the improved friction clutch and its seats 6, 105, 206, 305 and diaphragm spring 404 is that the aforediscussed design of such parts contributes significantly to longer useful life of the diaphragm spring and hence to longer useful life of the entire friction clutch. As mentioned above, the clearances 18, 118, 218, 318 and 418 contribute to a significant reduction of the total area of contact between the diaphragm spring and the seat which is provided with bridges in the very regions where the diaphragm spring is most likely to be subjected to excessive deforming stresses or to the action of forces reaching a magnitude which can lead to cracking or complete breakage of the diaphragm spring. Thus, the provision of clearances shields from excessive stresses those portions of the outer marginal portion of the diaphragm spring which are already subjected to rather pronounced stresses and which are weakened by the provision of enlarged radially outermost portions of slots between the radially extending prongs. It has been found that the useful life of a diaphragm spring which is configurated, mounted and associated with seats in a manner as described in connection with FIGS. 1 to 11 is considerably longer than the useful life of diaphragm springs which are not shielded from stresses in the regions corresponding to those of the clearances 18, 118, 218, 318 and 418. Such clearances protect the marginal portion of the diaphragm spring from stresses in the regions of the outer ends of the prongs. The provision of clearances entails a shifting of the points of contact (note 18a in FIG. 18a) to regions where the stressing of the diaphragm spring is less pronounced, preferably into immediate proximity of and at both sides of each rib 13, 113, 213, 313 or 413. The other seat (such as the seat 5 of FIGS. 1–3) can also have an undulate shape so that it contacts the diaphragm spring only in immediate proximity of the ribs (and more specifically at both sides of each cavity which develops as a result of the making of ribs).

While a reduction of the number of clearances to less than the number of ribs and bridges can result in some savings as concerns the making of the respective seat, the provision of a clearance between each pair of neighboring bridges brings about the advantage that the distribution of ribs, bridges and arcs is fully symmetrical so that the seat or seats can be assembled with the cover and with the diaphragm spring in any one of a practically infinite number of different angular positions. This contributes to lower assembly cost of the friction clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a diaphragm spring having a first side and a second side and including a circumferentially complete outer marginal portion and an annulus of prongs extending substantially radially inwardly from said marginal portion, said spring further having slots alternating with said prongs and at least some of said prongs having elongated reinforcing portions extending from said second side and radially outwardly beyond the neighboring slots; a cover adjacent to one side of said spring; a first ring-shaped seat provided on said cover adjacent to the first side of said spring in the region of said reinforcing portions; and a second ring-shaped seat provided on said cover adjacent to the second side of said spring opposite said first seat, so that said spring can pivot between said seats, said second seat having arcuate portions each bridging a different one of said reinforcing portions, said spring and said second seat defining clearances intermediate at least some of said arcuate portions of said second seat.

2. The clutch of claim 1, wherein each of said reinforcing portions is in register with a complementary cavity in the first side of said spring.

3. The clutch of claim 1, further comprising a plurality of fasteners connecting said cover with the seat at the other side of said spring, each of said fasteners being flanked by a pair of said reinforcing portions and one of said clearances being disposed between each of said pairs of reinforcing portions.

4. The clutch of claim 1, wherein one of said clearances is provided between each pair of neighboring arcuate portions of said second seat.

5. The clutch of claim 1, wherein said second side of said spring has depressions constituting or forming part of said clearances.

6. The clutch of claim 1, wherein said spring has deformed portions in the regions of said clearances so that each such deformed portion and the adjacent portion of said second seat define one of said clearances.

7. The clutch of claim 1, wherein said spring has alternating hills and valleys and each of said clearances is adjacent to one of said valleys.

8. The clutch of claim 1, wherein said spring has alternating hills and valleys and said hills extend from said second side thereof.

9. The clutch of claim 1, wherein said second seat has undulations disposed intermediate said arcuate portions and constituting or forming part of said clearances.

10. The clutch of claim 9, wherein said second seat has a single undulation intermediate each pair of neighboring arcuate portions.

11. The clutch of claim 9, wherein each of said arcuate portions has a concave side facing the second side of said spring and the depth of such arcuate portions exceeds the depth of said undulations as measured axially of said diaphragm spring.

12. The clutch of claim 1, wherein the depth of said clearances, as measured in the axial direction of said diaphragm spring, is between 0.03 and 0.4 mm.

13. The clutch of claim 1, wherein the depth of said clearances, as measured in the axial direction of said diaphragm spring, is between 0.05 and 0.2 mm.

14. The clutch of claim 1, wherein said one side is the first side of said spring and said second seat is a wire ring, said wire ring having undulations alternating with said arcuate portions and each such undulation having a concave side facing the second side of said spring in the region of one of said clearances, said arcuate portions also having concave sides facing the respective reinforcing portions.

15. The clutch of claim 1, wherein said one side is the first side of said spring and said second seat includes a washer, said washer having undulations alternating with said arcuate portions and each such undulation having a concave side facing the second side of said spring, said arcuate portions also having concave sides facing the respective reinforcing portions.

16. The clutch of claim 15, wherein said washer constitutes or forms part of a diaphragm spring.

17. The clutch of claim 1, wherein said one side is said second side of said spring and said second seat is an integral part of said cover.

18. The clutch of claim 17, wherein said cover includes undulations alternating with said arcuate portions and each such undulation having a concave side facing the second side of said spring in the region of one of said clearances.

19. The clutch of claim 18, wherein said second seat is a substantially ring-shaped rib provided in said cover.

20. The clutch of claim 1, wherein said one side is the second side of said spring, said second seat including a wire ring which is interposed between said cover and said spring, said wire ring having undulations alternating with said arcuate portions and such undulations having concave sides facing the second side of said spring in the regions of said clearances.

21. The clutch of claim 20, wherein said cover has openings for portions at least of said arcuate portions.

22. The clutch of claim 20, wherein said cover has an innerside facing said spring and said arcuate portions of said wire ring extend outwardly beyond the inner side of said cover.

23. The clutch of claim 1, wherein at least some arcuate portions of said second seat are out of contact with the respective reinforcing portions of said spring.

24. The clutch of claim 1, wherein at least a portion of each of said arcuate portions is out of contact with the respective reinforcing portion of said spring.

25. The clutch of claim 1, wherein at least some arcuate portions of said second seat are out of contact with the respective reinforcing portions and the mutual spacing of such arcuate portions and the respective reinforcing portions is between 0.02 and 1 mm.

26. The clutch of claim 1, wherein at least some of said arcuate portions are out of contact with the respective reinforcing portions and the mutual spacing of such arcuate portions and the respective reinforcing portions is between 0.05 and 0.8 mm.

27. The clutch of claim 1, wherein at least said second seat has contact portions flanking and immediately adjacent to said reinforcing portions and abutting the second side of said spring.

28. The clutch of claim 27, wherein said first seat includes contact portions flanking and immediately adjacent to said reinforcing portions and abutting the first side of said spring.

29. The clutch of claim 1, wherein said second seat includes a plurality of sinusoidal portions and each such sinusoidal portion includes a plurality of said arcuate portions, each of said sinusoidal portions further including undulations alternating with said arcuate portions, said sinusoidal portions and said arcuate portions having concave sides facing the second side of said spring, the depth of said arcuate portions, as considered axially of said spring, exceeding the depth of said sinusoidal portions and the depth of said sinusoidal portions exceeding the depth of said undulations.

30. A substantially ring-shaped seat for use in a friction clutch at one side of a diaphragm spring of the type having a circumferentially complete marginal portion, a plurality of substantially radially disposed prongs extending inwardly from said marginal portion, slots alternating with said prongs, and elongated reinforcing portions provided on at least some of said prongs and extending radially outwardly beyond the neighboring slots and beyond said one side, said seat comprising arcuate portions for said reinforcing portions and undulations alternating with said arcuate portions and having concave sides facing the one side of the spring.

31. The seat of claim 30, wherein said undulations are shallower than said arcuate portions, as considered in the axial direction of said seat.

* * * * *